United States Patent [19]
Funk et al.

[11] 3,937,908
[45] Feb. 10, 1976

[54] NETWORK PATH TEST CIRCUIT

[75] Inventors: Charles John Funk, Columbus; George Minchenko, Reynoldsburg, both of Ohio

[73] Assignee: Bell Telephone Laboratories, Incorporated, Murray Hill, N.J.

[22] Filed: Jan. 27, 1975

[21] Appl. No.: 544,235

[52] U.S. Cl. ............... 179/175.2 R; 179/175.23
[51] Int. Cl.² ........................................ H04M 3/24
[58] Field of Search... 179/175.2 R, 175.23, 175.25, 179/175.3 R

[56] References Cited
UNITED STATES PATENTS

| | | | |
|---|---|---|---|
| 2,719,886 | 10/1955 | Shoffstall | 179/175.2 R |
| 3,064,090 | 11/1962 | Hersey | 179/175.25 |
| 3,378,650 | 4/1968 | Goeller | 179/175.2 R |
| 3,662,125 | 5/1972 | Haas | 179/175.2 R |
| 3,790,723 | 2/1974 | Stewart | 179/175.3 R |
| 3,808,381 | 4/1974 | Jacobs et al. | 179/175.2 R |
| 3,860,769 | 1/1975 | Pachynski | 179/175.3 R |

Primary Examiner—Douglas W. Olms
Attorney, Agent, or Firm—D. A. Marshall

[57] ABSTRACT

A network path test circuit for testing call connections established through the switch network of a telephone toll switching office. Common control equipment of the telephone toll switching office momentarily applies a tone signal to the transmit and receive paths of a call connection prior to outpulsing a called telephone station directory number. Detector apparatus measures the impedance reflected back over the call connection to determine the absence and existence of path transpositions in the call connection. The common control equipment is enabled to establish another call connection when the reflected impedance indicates path transpositions in the call connection.

12 Claims, 4 Drawing Figures

NETWORK PATH TEST CIRCUIT

BACKGROUND OF THE INVENTION

1. Field of the Invention

This invention concerns switching systems. In particular it relates to the testing of communication connections established through switching systems.

2. Description of the Prior Art

Telephone calls are established in the telephone direct distance dialing network between calling and called telephone stations through a hierarchy of switching systems. Many switching systems in the direct distance dialing network are designated as toll switching offices and are arranged to establish call connections for interconnecting other toll and local switching offices in order that a communication path may be established from a calling telephone station to a called telephone station both of which are served by local switching offices.

A toll switching office establishes call connections to a local switching office on a four-wire basis from an incoming trunk through cross-connected toll switching office equipment to an outgoing trunk. The outgoing trunk is extended by a transmission facility to a local switching office serving the called telephone station. After the call connection has been established the toll switching office equipment outpulses the called telephone station directory number over both a transmit and receive path from the incoming trunk through the toll switching office to the outgoing trunk. The outpulsed called telephone directory number signals appearing on both the transmit and receive path are combined in the outgoing trunk and transmitted over a two-wire trunk facility to the local switching office. The local switching office receives the combined directory number signals and utilizes them to establish a connection with the called telephone station.

It sometimes happens that a pair of leads comprising one path of a four-wire connection through the toll office switching equipment are inadvertently reversed or transposed. When this occurs with a two-wire transmission facility the directory number signals outpulsed by the toll office common control equipment are absorbed by the outgoing trunk instead of being combined. The local switching office does not receive digits of the called telephone station directory number. When this occurs the switching equipment of the local switching office times out after waiting for the directory number signals and the call connection is never completed to the called telephone station.

Telephone toll switching offices are presently arranged to perform several tests on four-wire call connections prior to completing a telephone call. In the first test the toll office common control equipment makes a false cross and ground test on four-wire connections partially established through the telephone switching office. This test checks for the grounding of leads comprising the partial connection and for erroneous short circuits that may appear across the path leads. During a second test the toll office common control equipment conducts a continuity test on each path of the four-wire connection to determine the continuity of leads comprising each path of the call connection. However, neither of these tests detects the presence of transposition of leads in a path through the toll switching office which would prevent the outpulsing of a called telephone directory number and the inconvenience of a lost call to a calling subscriber.

Accordingly, a need exists in the art for an arrangement for testing for path reversals of four-wire connections through a telephone toll switching office which result in the loss of telephone calls and the inconvenience of telephone subscribers. A need also exists for apparatus that responds to the detection of a path reversal of a four-wire call connection by establishing another four-wire call connection through a telephone toll switching office to complete a telephone call which would ordinarily be lost.

SUMMARY OF THE INVENTION

In the exemplary embodiment of the invention, a test circuit is provided for use with switching offices of a communication system to test for reversals and transpositions occurring in call connections established through a switch network of a switching office. Common control equipment of the switching office momentarily controls the test circuit to apply a test tone to both transmit and receive paths of a call connection established through the switch network of the switching office to a hybrid of a two-wire trunk extending to another switching office. The impedance resulting from the applied test tone and reflected back over both the transmit and receive paths of the call connection from transpositions two-wire trunk hybrid through the switch network is measured to determine the absence and existence of transpositions and reversals in both the transmit and receive paths. Detection of predetermined values of measured reflected impedances indicates the presence of transmit and receive path transportations and is utilized to control the switching office to establish another call connection through the switch network when it has been determined that a transposition or reversal exists in the original call connection.

In accordance with one feature of the invention, test circuit apparatus within common control equipment of a switching office measures the reflected impedance of a call connection established through a telephone switching office switch network to determine the absence or existence of transpositions and reversals occurring in the call connection path.

In accordance with another feature of the invention, test circuit apparatus is provided for use in telephone switching office common control equipment to momentarily apply a test tone to the switch network path of a call connection established through the telephone switching office. Additional apparatus of the test circuit measures the reflected network path impedance to detect the presence of transpositions and reversals in the network path and enables the common control equipment to establish another call connection when a predetermined value of reflected impedance indicates that a network path reversal exists in the original call connection.

In accordance with still another feature of the invention, common control equipment of a telephone switching office is back with a switch network path reversal test circuit arranged to connect the transmit and receive legs of a test hybrid coupled to a signal generator to the transmit and receive paths of a four-wire call connection established through the telephone office switch network to the hybrid of a two-wire trunk extending to another telephone switching office. Apparatus controls the signal generator to momentarily apply a tone signal through the test hybrid simultaneously to both the four-wire call connection transmit and receive paths prior to the outpulsing of called telephone station number digits. Detector apparatus measures the resulting impedances reflected bath from the two-wire trunk hybrid through the switch network and controls the common control equipment to re-establish the four-wire call connection over another switch network path when a predetermined value of reflected impedance indicates a transmit or receive path transposition in the original four-wire call connection.

DESCRIPTION OF THE DRAWING

The foregoing objectives and advantages, as well as other of the invention, will be more apparent from a description of the exemplary embodiment shown in the drawing in which.

Figure 1:
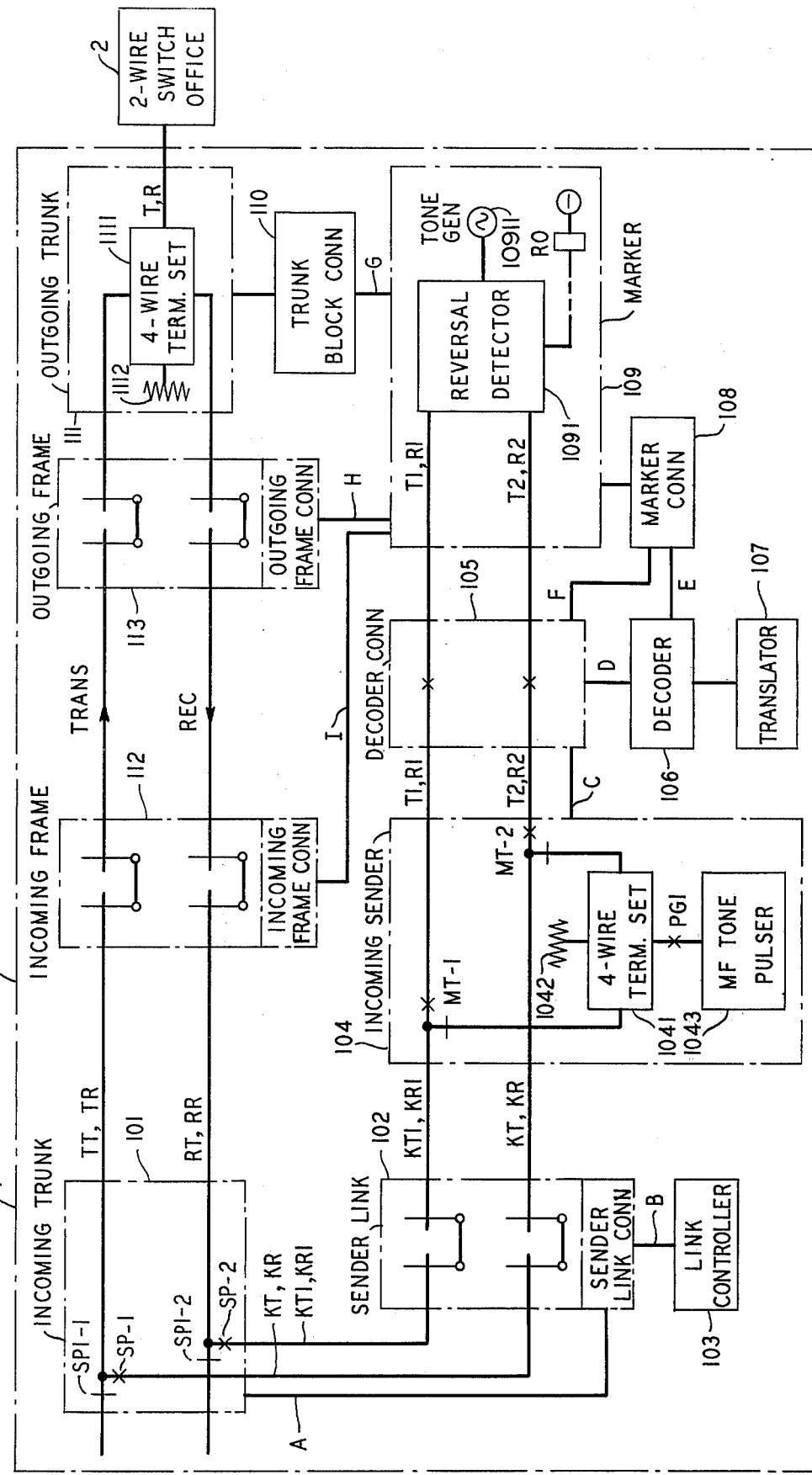
FIG. 1 illustrates a telephone toll switching office embodying the network path test apparatus of the instant invention.

It will be noted that the drawing employs a type of notation referred to as "Detached Contact" in which an "X," shown intersecting a conductor, represents a normally open "make" contact of a relay, and a "bar," shown intersecting a conductor at right angles, represents a normally closed "break" contact of a relay; "normally" referring to the unoperated condition of the relay. The principles of this type of notation are described in an article entitled "An Improved Detached-Contact-Type of Schematic Circuit Drawing" by F. T. Meyer in the September, 1955, publication of the *American Institute of Electrical Engineers Transactions, Communications and Electronics*, Volume 74, pages 505-513.

GENERAL DESCRIPTION

Referring now to FIG. 1 of the drawing, it is intended that toll switching office 1 be a conventional and well-known type of toll switching system such as the No. 4A Crossbar toll system that is presently used in the telephone direct distant dialing network. This type of system is described by J. B. Nelson in an article entitled "Common Control Features in Nationwide Dial in g," *Bell Laboratories Record*, December, 1953. The present invention is not limited for use with a telephone toll switching system of this type but may also be advantageously utilized with other types of switching systems as well.

An incoming call arrives at toll switching office 1 over incoming trunk 101 which has been seized by another switching office of the telephone direct distance dialing network. Incoming trunk 101 responds in the well-known manner to a seizure by requesting the sender link connector of sender link 102 over path A to locate an idle incoming sender. The sender link connector responds by directing link controller 103, via path B, to select an idle incoming sender 104 and to close switches in sender link 102 to establish pulsing path KT, KR, KT1, KR1 between incoming trunk 101 and idle incoming sender 104.

In the well-known manner, incoming sender 104 receives called telephone station directory number digit signals for another telephone switching office over transmit path TT, TR extending through sender link 102 to incoming sender 104. Incoming sender 104 records digits of the received called telephone station directory number and signals decoder connector 105, via path C, to seize decoder 106 over path D. Decoder 106 immediately seizes translator 107 and digits of the called telephone station directory number are transmitted from incoming sender 104 through decoder 106 to translator 107.

Decoder 106 receives translation information from translator 107 and responds thereto by directing marker connector 108 over path E to seize an idle marker 109. When marker 109 has been selected, marker connector 108 signals decoder connector 105 over path F to connect incoming sender leads T1, R1, T2, R2 with marker 109. Marker 109 obtains location of outgoing trunks suitable for use on this call from decoder 106 and proceeds to select outgoing trunk 111 in the well-known manner via trunk block connector 110. Decoder 106 and translator 107 then release from the connection.

Marker 109 directs incoming and outgoing frame connectors over paths I, H to set the switches of incoming and outgoing frames 112, 113 and thereby establish transmit and receive paths TT, TR, RT, RR from incoming trunk 101 to outgoing trunk 111. Transmit and receive paths are established at this time from reversal detector 1091 over leads T2, R2, T1, R1 from marker 109 through decoder connector 105, the make portion of transfer contacts MT-2, MT-1 of incoming sender 104 to transmit and receive pulsing path leads KT, KR, KT1, KR1. Transmit and receive pulsing path leads KT, kR, KT1, KR1 are extended through sender link 102 and make contacts SP-1, SP-2 of incoming trunk 101 and over leads TT, TR, RT, RR through incoming and outgoing frames 112, 113 of the switch network to four-wire term set 1111 of outgoing trunk 111.

Marker 109 initiates a reversal test of the transmit and receive paths TT, TR, RT, RR established through toll switching office switch network by enabling tone generator 1092 to momentarily apply a test tone simultaneously to both transmit path T2, R2 and receive path T1, R1. The resulting impedance reflected back from four-wire hybrid or term set 1111 of outgoing trunk 111 through the switch network to marker 109 enables reversal detector 1091 to detect the presence of a reversal or transposition in either the leads of transmit path TT, TR or the leads of receive path RT, RR.

In the event that a lead reversal exists in the transmit or receive path, reversal detector 1091 detects presence of the reversal from the value of impedance reflected back from outgoing trunk 111 and informs marker 109 of a defective pulsing path by operating reorder relay RO. Operation of relay RO directs marker 109 to select another outgoing trunk to telephone switching office 2 and to establish a new call connection from incoming trunk 101 through incoming and outgoing frames 112, 113 of the switch network to the selected outgoing trunk.

After testing for path reversals and determining the absence thereof marker 109 transfers outpulsing information to incoming sender 104 and releases from the call connection. Incoming sender 104 subsequently enables multifrequency tone pulser 1043 to outpulse digit signals of the called telephone station directory number through make contacts PG1, four-wire term set 1041 and the break portion of released transfer contacts MT-1, MT-2 to both the transmit and receive paths TT, TR, RT, RR of incoming trunk 101. The outpulsed digit signals received from incoming trunk 101 over both transmit and receive paths TT, TR, RT, RR are combined in four-wire term set 1111 of outgoing trunk 111 and transmitted over two-wire trunk facility T, R to telephone local switching office 2. At local switching office 2 the received directory number digits enable the completion of a communication path between the calling and called telephone stations.

It will be clear from the above general description and the subsequent detailed description that the novel arrangement contemplated by the invention enables a telephone toll switching office to test for path reversals of a call connection established through the office switch network. Identification of a call connection path reversal in the switch network and the establishment of another call connection prior to outpulsing thereby prevents lost call connections caused by failure of a local telephone switching office to receive outpulsed directory number signals.

DETAILED DESCRIPTION

A. Outpulsing Path

Figure 2:
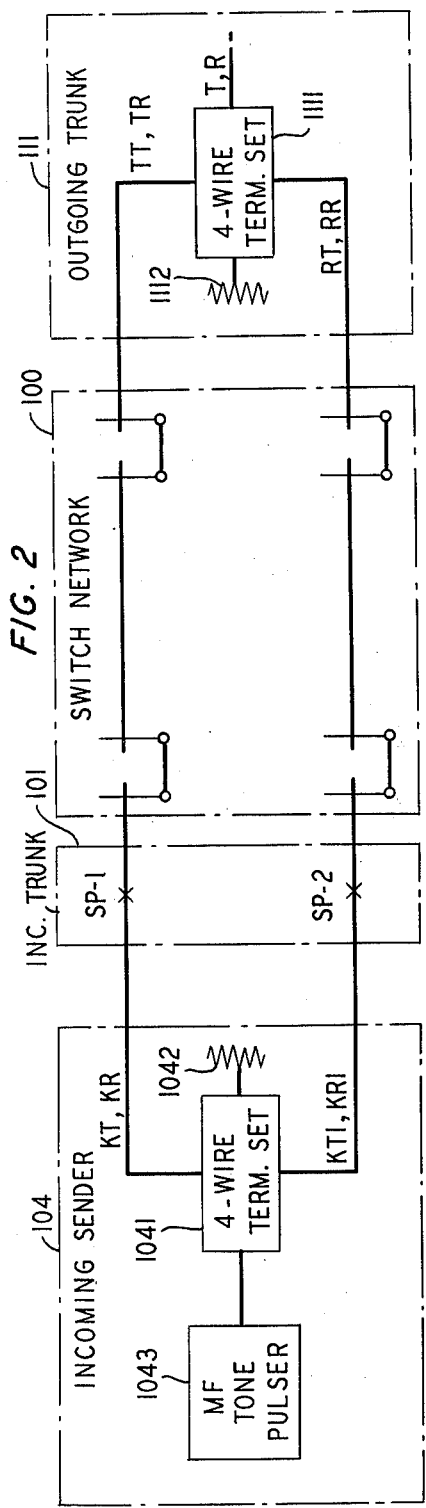
FIG. 2 and 3 depict details of testing call connections through the switch network of a telephone switching office.

Referring now to FIG. 2 of the drawing, the pulsing path of telephone toll switching office 1 extends from incoming sender 104 through incoming trunk 101 and switch network 100 to outgoing trunk 111. Four-wire term set 1041 of incoming sender 104 is connected by a transmit pulsing path comprised of two leads KT, KR and a receive pulsing path comprised of two leads KT1, KR1 with the two-wire transmit path TT, TR and two-wire receive path RT, RR, respectively, of the call connection extending to four-wire term set 1111 of outgoing trunk 111.

During the outpulsing sequence incoming sender 104 controls tone pulser 1043 in the well-known manner to apply digital tone signals to the input of four-wire term set 1041. The digital tone signals appearing at the input of four-wire term set 1041 are split and simultaneously applied to two-wire transmit pulsing path KT, KR and two-wire receive pulsing path KT1, KR1. Digital tone signals subsequently appearing on two-wire transmit path TT, TR and two-wire receive path RT, RR through make contacts SP-1, SP-2 of incoming trunk 101 are combined by four-wire term set 1111 and transmitted from outgoing trunk 111 on two-wire trunk facility T, R to telephone switching office 2. In the event there is a reversal in either the switch network transmit and receive paths the digital tone signals appearing at the TT, TR, RT, RR inputs of four-wire term set 1111 will cancel each other thereby resulting in the absence of digital tone signals at the output T, R of four-wire term set 1111.

B. Reversal Test Path

Figure 3:
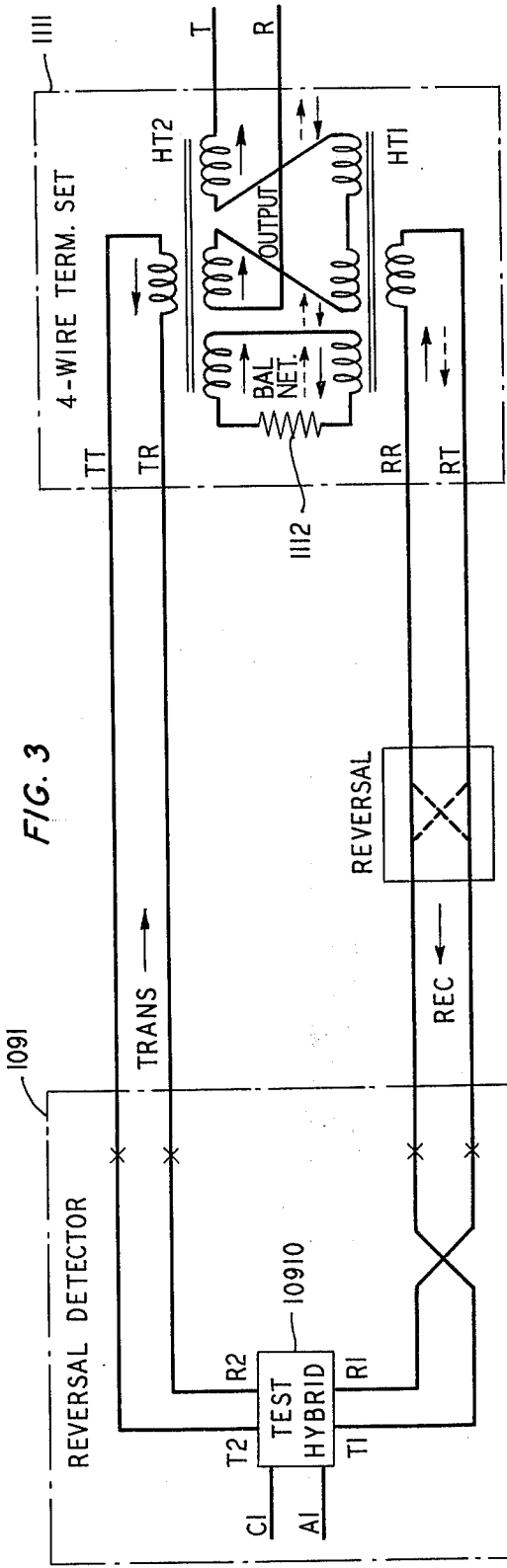

Prior to the outpulsing of the called telephone station directory number digits, the two-wire output T, R of four-wire term set 1111 is terminated in an open or high impedance state. As set forth in FIG. 3 of the drawing, the two-wire transmit path TT, TR of the call connection is connected to the input of coil HT2. Similarly, the call connection two-wire receive path RT, RR is connected to the input of coil HT1.

Marker 109 initiates a reversal test of the call connection prior to the outpulsing sequence by connecting reversal detector 1091 to the call connection. Reversal connector 1091 includes a test hybrid 10910 that is identical in construction to four-wire term set 1111 and has a two-wire input C1, A1. During the test sequence marker 109 connects the transmit leads T2, R2 of test hybrid 10910 directly to leads TT, TR of the transmit path terminated at input coil HT2 of four-wire term set 1111. Receive leads T1, R1 of test hybrid 10910 are reversed so that lead T1 is coupled to receive path lead RR and lead R1 is coupled to receive path lead RT.

The momentarily application of test tone signal to input C1, A1 of test hybrid 10910 causes current to flow in the input coils HT1, HT2 of four-wire term set 1111 in the direction shown by the solid lines. Since four-wire term set 1111 leads T, R are terminated with a high value of impedance little current is induced into the output circuit coils HT1, HT2. However, the current induced into the balance network of coils HT1, HT2 is in such a direction as to add in network impedance 1112 and thereby reflect a low value of impedance at the input of coils HT1, HT2. The low impedances appearing on the transmit and receive paths TT, TR, RT, RR of the call connection are reflected back through test hybrid 10910 and appear as a low impedance across test hybrid input leads C1, A1.

If a reversal is present in the call connection, for example, receive path leads RT, RR may be reversed in the switch network, the current resulting from the test tone signal would flow in the input of coil HT1 in the direction indicated by the dotted line. As in the nonreversal situation, little current is induced into the output circuit of coils HT1, HT2 because of the large inpedance appearing across output leads T, R. The resulting current induced into the balance network by reverse current flowing in coil HT1 cancels the current induced into the balance network by the normal current flowing in coil HT2 and thereby results in a high value of impedance appearing in the call connection transmit and receive paths. These high impedances are reflected back to the T1, R1, T2, R2 inputs of test hybrid 10910 and appear as a high impedance across the test hybrid input C1, A1.

Thus, on a normal call connection the momentarily application of a test tone to the C1, A1 input of test hybrid 10910 results in a low value of impedance appearing across test hybrid input C1, A1. A high value of impedance appearing across test hybrid input C1, A1 indicates that a lead reversal has occurred in either the call connection transmit path leads TT, TR or the receive path leads TR, RR.

C. Reversal Detector Calibration

Figure 4:
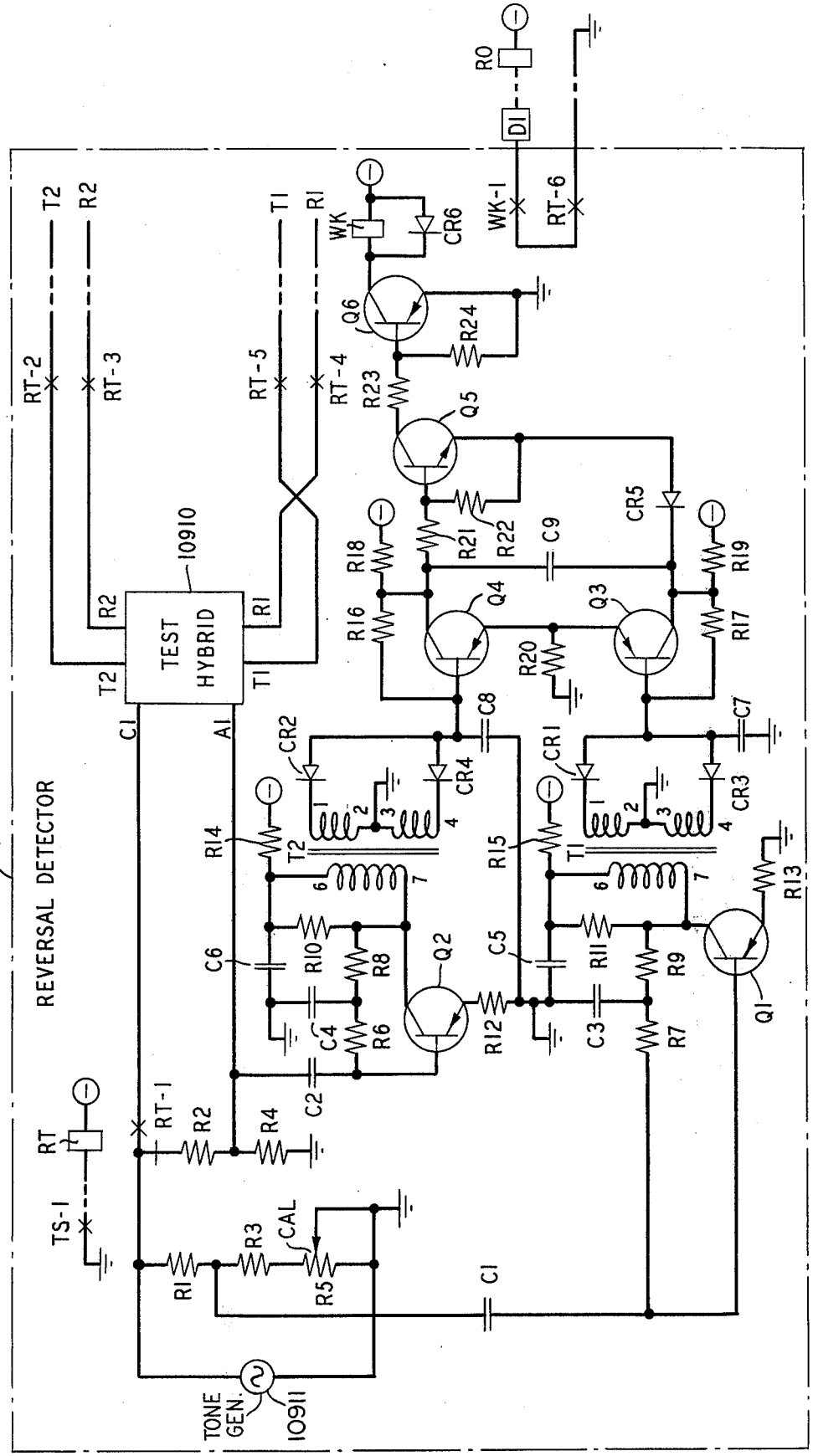
FIG. 4 sets forth the schematic details of the instant network path test apparatus.

Referring now to FIG. 4 of the drawing, reversal detector 1091 includes a tone generator 10911 which is normally terminated in a first resistance path consisting of series resistors R1, R3, R5 connected in parallel with a second resistance path comprising the normal portion of transfer contacts RT-1 connected in series with resistors R2, R4. In the normal position relay RT is in a released state and resistor R2 is connected in series through the break portion of transfer contacts RT-1 with resistor R4. The resistance of R5 is adjusted so that the collector voltage of transistor Q3 developed from the reference voltage appearing across resistors R3, R5 and amplified by transistor Q1 is equal to the collector voltage of transistor Q4. When this occurs, the base potential of unbalance detector transistor Q5 is equal to the emitter potential and transistor Q5 is maintained in a nonconducting state. With transistor Q5 in the nonconducting state, ground appears on both the base and emitter of transistor Q6 thereby inhibiting the operation of relay WK.

Thus, during the interval of time that relay RT is released, the WK relay of reversal detector 1091 remains unoperated due to the resistor R2 connected across input C1, A1 of test hybrid 10910.

D. Test of Call Connection Path

Marker 109 of telephone toll switching office 1 initiates a test of the call connection path by momentarily closing make contacts TS-1 to provide an operate path for relay RT. As shown in FIG. 4 of the drawing, relay RT in operating opens the break portion of transfer contacts RT-1 to disconnect resistor R2 from tone generator 10911 and causes the make portion of transfer contacts RT-1 to substitute the input impedance of test hybrid 10910 therefore. Tone signal from tone generator 10911, formerly appearing across resistor R2, is now applied through the make portion of transfer contacts RT-1 to the C1, A1 input of test hybrid 10910. Operation of relay RT also closes make contacts RT-6 to activate timer D1 by applying ground through break contacts WK-1 to input of timer D1.

The tone signal appearing at the input of test hybrid 10910 is simultaneously applied to both transmit path T2, R2 and receive path T1, R1 through make contacts RT-2, RT-3, RT-4, RT-5 and the switch network to outgoing trunk four-wire term set 1111. Assuming that there are no reversals appearing on the call connection, a low value of impedance is reflected back over both the transmit and receive paths of the call connection and appears across input C1, A1 of test hybrid 10910.

Since resistor R2 is greater than the reflected impedance, the voltage appearing across resistor R4 will increase. An increase of voltage appearing across resistor R4 is coupled, via capacitor C2, to the base input of amplifier transistor Q2. The increase voltage signal is then amplified by transistor Q2 and appears at the secondary winding of transformer T2 where it is rectified by a full wave rectifier composed of diodes CR2 and CR4. Increased output of the full wave rectifier increases the charge of capacitor C8 and thereby drives the base of transistor Q4 more negative. As the base goes more negative, more current flows through transistor Q4 and the collector thereof becomes more positive with respect to the collector of transistor Q3. Current then flows from the collector of transistor Q4 through resistors R21, R22 to the collector of transistor Q3 through diode CR5. The resulting voltage developed across resistor R22 forward biases transistor Q5 and causes current to flow from ground through resistors R24, R23, the collector-emitter circuit of transistor Q5 and diode CR5 to the collector of transistor Q3. The voltage developed across resistor R24 forward biases transistor Q6 and enables transistor Q6 to conduct and operate relay WK. Relay WK indicates the satisfactory completion of the test by operating and opening break contacts WK-1 to remove ground from the input of timer D1 and thereby prevent operation of relay RO. The failure of relay RO to operate at this time denotes satisfactory completion of the test of the call connection.

After testing the call connection for transmit and receive path reversals, marker 109, FIG. 1 of the drawing, signals incoming sender 104 to initiate outpulsing and the releases from the call connection. Incoming sender 104 outpulses called telephone station directory number signals from multifrequency tone pulser 1043 through make contacts PG1 and four-wire term set 1041 simultaneously over both transmit and receive paths TT, TR, RT, RR to outgoing trunk 111. The number signals are combined in four-wire term set 1111 and transmitted over trunk facility T, R to telephone switch office 2 in order that a communication path may be established between calling and called telephone stations.

When there is a reversal or transposition in the call connection transmit or receive path, the value of reflected impedance, FIG. 4, appearing across input leads C1, A1 is large thereby causing a decrease in the voltage appearing across resistor R4. The resulting decrease of voltage appearing on the base of amplifier transistor Q2 reduces the charge on capacitor C8 and thereby drives the base of transistor Q4 in a positive direction. With the base more positive, current flow decreases through transistor Q4 and makes the collector thereof more negative and maintains unbalance detector transistor Q5 in the nonconducting state. Diode CR5 prevents reverse current flow from the collector of transistor Q3 to the collector of transistor Q4 while capacitor C9 filters out noise and alternating current unbalance signals appearing between the collectors of transistors Q3, Q4. When transistor Q5 is in the nonconducting state, ground appears on both the base and emitter of transistor Q6 thereby preventing the operation of both transistor Q6 and relay WK. After a predetermined time the D1 timer operates relay RO to indicate a reversal of the call connection.

Operation of relay RO enables marker 109 to initiate a sequence in the well-known manner to establish a trouble record. After registration of the trouble record, marker 109, FIG. 1 of the drawing, releases outgoing trunk 111 and transmits a second trial indication to decoder connector 105. Marker 109 then releases from the connection. Decoder connector 105 subsequently starts a new call cycle by reselecting decoder 106 which in turn seizes marker 109 to select another outgoing trunk. In the heretofore described manner, marker 109 re-establishes another call connection between incoming trunk 101 and the selected outgoing trunk, tests the new call connection for path transpositions, and upon successfully concluding the path reversal test, completes a call connection between a calling and called telephone station.

SUMMARY

It is appreciated from the foregoing that the facility, economy, and efficiency of telephone switching systems may be substantially enhanced by the provision of apparatus arranged to test for transpositions occurring in call connections established through the switch network of a telephone switching system. It is further realized from the foregoing that the instant network path test circuit aids a telephone switching office to complete call connections to called telephone stations by reducing the number of lost calls experienced by calling telephone station subscribers.

While the apparatus of the invention has been disclosed in a telephone toll switching system it is to be understood that such an embodiment is intended to be illustrative of the principles of the invention and that other arrangements may be devised by those skilled in the art without departing in the spirit and scope of the invention.

What is claimed is:

1. A test circuit for testing call connections established through a switch network of a switching system, said test circuit comprising
- means for applying a test tone signal simultaneously to both a transmit and receive path comprising one of the call connections, and
- means responsive to said tone applying means for detecting path reversals occurring in the call connections and for enabling the switching system to establish another call connection in accordance with a predetermined value of reflected impedance of the call connection denoting a transmit and receive path reversal.

2. The test circuit set forth in claim 1 wherein said applying means comprises
- means for generating the test tone signal, and
- means enabled by the switching system for momentarily coupling said tone signal generating means simultaneously to both the call connection transmit and receive paths.

3. The test circuit as set forth in claim 2 wherein said coupling means comprises
- hybrid means having an input circuit and a pair of output circuits for coupling tone signals appearing on the input circuit simultaneously to both output circuits, and
- relay means selectively operated by the switching system for connecting said tone signal generating means to the hybrid input circuit and each of the hybrid output circuits individually to the call connection transmit and receive paths.

4. The test circuit as set forth in claim 3 wherein said detecting and enabling means comprises
- means for measuring impedance reflected by the call connection transmit and receive paths at the input circuit of the hybrid, and
- means enabled by a predetermined value of the measured impedance for indicating to the switching system an occurrence of a wire transposition in the transmit path and the receive path of the call connection.

5. The test circuit as set forth in claim 4 wherein said detecting and enabling means further comprises
- means fir signaling the switching system to initiate the establishment of the other call connection through the switching network a predetermined interval of time after detecting the occurrence of the transmit and receive path wire transposition.

6. A test circuit for use in testing telephone call connections established through a switch network of a telephone switching office, said test circuit comprising
- means for generating a test tone signal,
- means for momentarily coupling said tone signal generating means simultaneously to both a transmit and receive path comprising one of the telephone call connections,
- means responsive to said tone signal generating means for measuring impedance reflected by the call connection transmit and receive paths into said coupling means, and
- means for enabling the telephone switching office to initiate establishment of another telephone call connection through the switch network when a predetermined value of the measured reflected impedance indicates a wire transposition in the call connection transmit and receive paths.

7. The test circuit set forth in claim 6 wherein said momentarily coupling means comprises
- a relay responsive to the telephone switching office,
- a hybrid having an input circuit and a pair of output circuits and arranged to couple a tone signal appearing on the input circuit simultaneously to both output circuits, and
- means comprising make contacts of said relay for connecting said tone signal generating means to the hybrid input circuit and each of the hybrid output circuits individually to the call connection transmit and receive paths.

8. The test circuit set forth in claim 7 wherein said measuring means comprises
- means connected to said tone signal generating means for generating a reference signal having a predetermined voltage level, and
- means including the hybrid input circuit and connected to said tone signal generating means by operation of said relay for generating a variable signal having values depending upon the reflected impedance appearing at the input circuit of said hybrid.

9. The test circuit set forth in claim 8 wherein said measuring means further comprises
- amplifying and rectifying means coupled to said reference and said variable signal generating means for generating a first output voltage signal from said reference signal and a second output voltage signal in response to said variable signal, and
- detector means coupled to said amplifying and rectifying means for generating a bias voltage output signal when said second output voltage signal is greater in magnitude than a predetermined value of said first output voltage signal and for inhibiting the generation of the bias voltage output signal when said second output voltage signal is less than the predetermined value of said first output voltage signal.

10. The test circuit set forth in claim 9 wherein said enabling means comprises
- control means coupled to said detector means and responsive to the bias voltage output signal thereof for signaling absence and presence of wire transpositions in the transmit and the receive path of the call connection to the telephone switching office in accordance with the value of the reflected impedance appearing at the input circuit of said hybrid.

11. A test circuit for use in testing a telephone call connection established through a switch network of a telephone switching office from a four-wire incoming trunk to a two-wire outgoing hybrid trunk, said test circuit comprising
- generator means for generating a test tone signal,
- hybrid means having an input circuit and a pair of output circuits for coupling a tone signal appearing on the input circuit simultaneously to both output circuits,
- relay means responsive to the telephone switching office and having contacts for momentarily connecting said generator means to the hybrid means input circuit and each of the hybrid means output circuits individually to a transmit path and a receive path of the four-wire incoming trunk,
- first path means connected across said generator means for generating a first tone signal having a predetermined voltage level,
- second path means including the hybrid means input circuit and connected across said generator means by operation of said contacts for generating second tone signals of voltage levels corresponding to values of impedance reflected back over the telephone call connection from the two-wire hybrid trunk through the switch network to the hybrid means input circuits, amplifying and rectifying means coupled to said first and said second path means for generating a first output voltage from said first tone signal and various values of a second output voltage in response to said second tone signals, detector means coupled to said amplifying and rectifying means for generating a bias voltage output signal when said second output voltage is greater in magnitude than a predetermined value of said first output voltage and for inhibiting the generation of the bias voltage output signal when said second output voltage is less in magnitude than the predetermined value of said first output voltage, and means coupled to said detector means and responsive to the bias voltage output signal thereof for signaling absence and presence of wire transpositions in the call connection transmit and receive paths to the telephone switching office and for enabling the telephone switching office to establish another call connection when the reflected impedance appearing at the hybrid means input circuit indicates a wire transposition in the call connection transmit and receive paths.

12. A switch network path reversal test circuit for use in testing transmit and receive paths of a telephone connection established through a telephone switching office, said test circuit comprising a tone signal generator a hybrid having an input circuit and a pair of output circuits for coupling a tone signal appearing on the input circuit simultaneously to both output circuits, a relay responsive to the telephone switching office having make contacts for connecting said tone signal generator to the hybrid input circuit and each of the hybrid output circuits individually to the transmit and receive paths, and means coupled to said tone signal generator and said hybrid by operation of said relay for detecting presence of path reversals occurring in the transmit and receive paths of the telephone connection in accordance with the transmit and receive path inpedances reflected into the hybrid input circuit.

* * * * *

UNITED STATES PATENT AND TRADEMARK OFFICE
CERTIFICATE OF CORRECTION

PATENT NO. : 3,937,908
DATED : February 10, 1976
INVENTOR(S) : Charles J. Funk and George Minchenko It is certified that error appears in the above–identified patent and that said Letters Patent are hereby corrected as shown below:

Column 6, line 48, "TR, RR" should read --RT, RR--. Column 9, line 44, "fir" should read --for--. Column 11, line 5, "circuits" should read --circuit--.

Signed and Sealed this twenty-fifth Day of May 1976

[SEAL]

Attest:

RUTH C. MASON
Attesting Officer

C. MARSHALL DANN
Commissioner of Patents and Trademarks